Aug. 4, 1970     J. SIBTHORP     3,522,646

METHOD OF PRODUCING CLIPS FOR SPRINGS

Original Filed Nov. 14, 1966     4 Sheets-Sheet 1

INVENTOR
JAMES SIBTHORP
BY
Cushman Darby Cushman
ATTORNEYS

Aug. 4, 1970     J. SIBTHORP     3,522,646

METHOD OF PRODUCING CLIPS FOR SPRINGS

Original Filed Nov. 14, 1966     4 Sheets-Sheet 2

INVENTOR
JAMES SIBTHORP
BY
Cushman, Darby & Cushman
ATTORNEYS

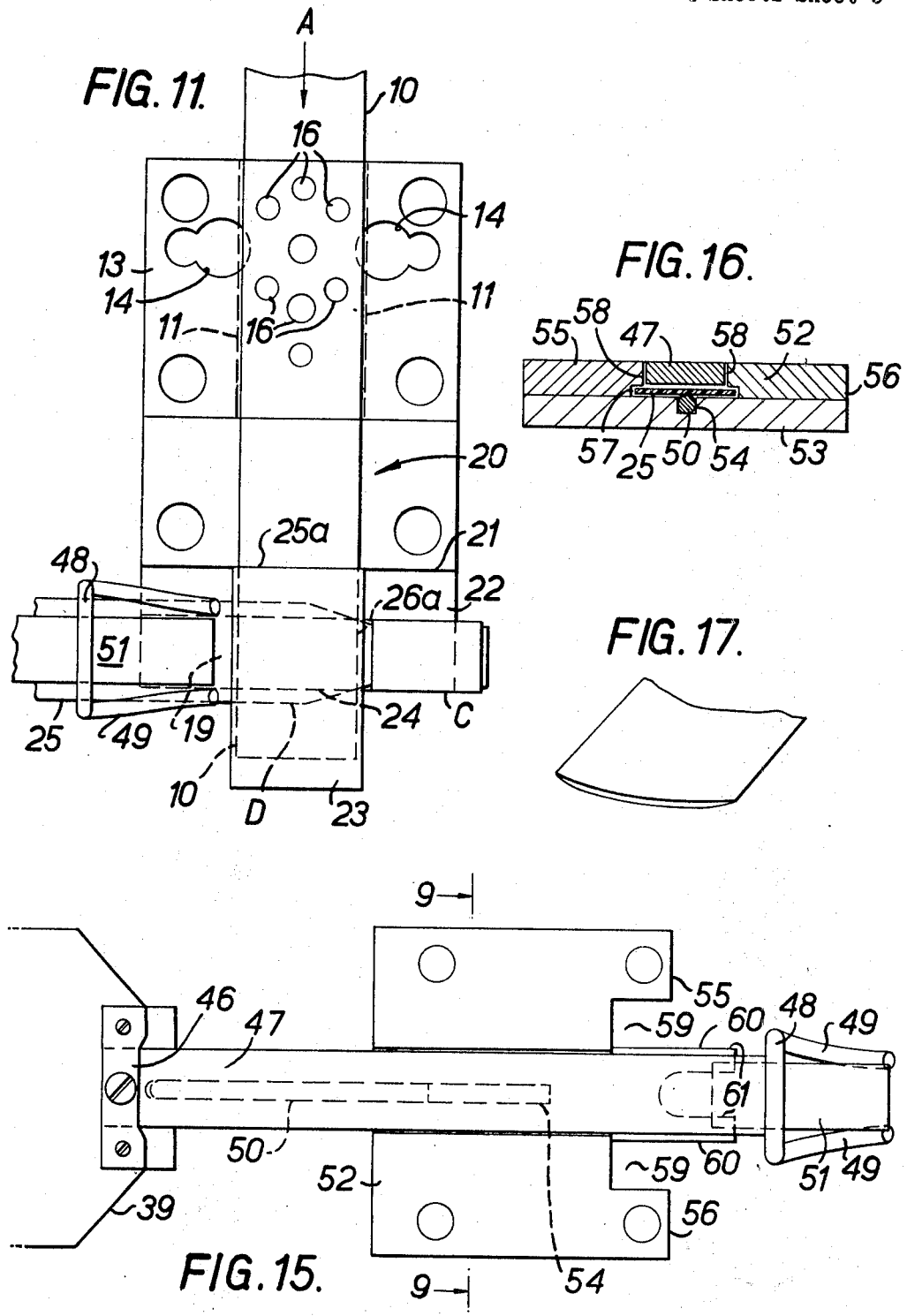

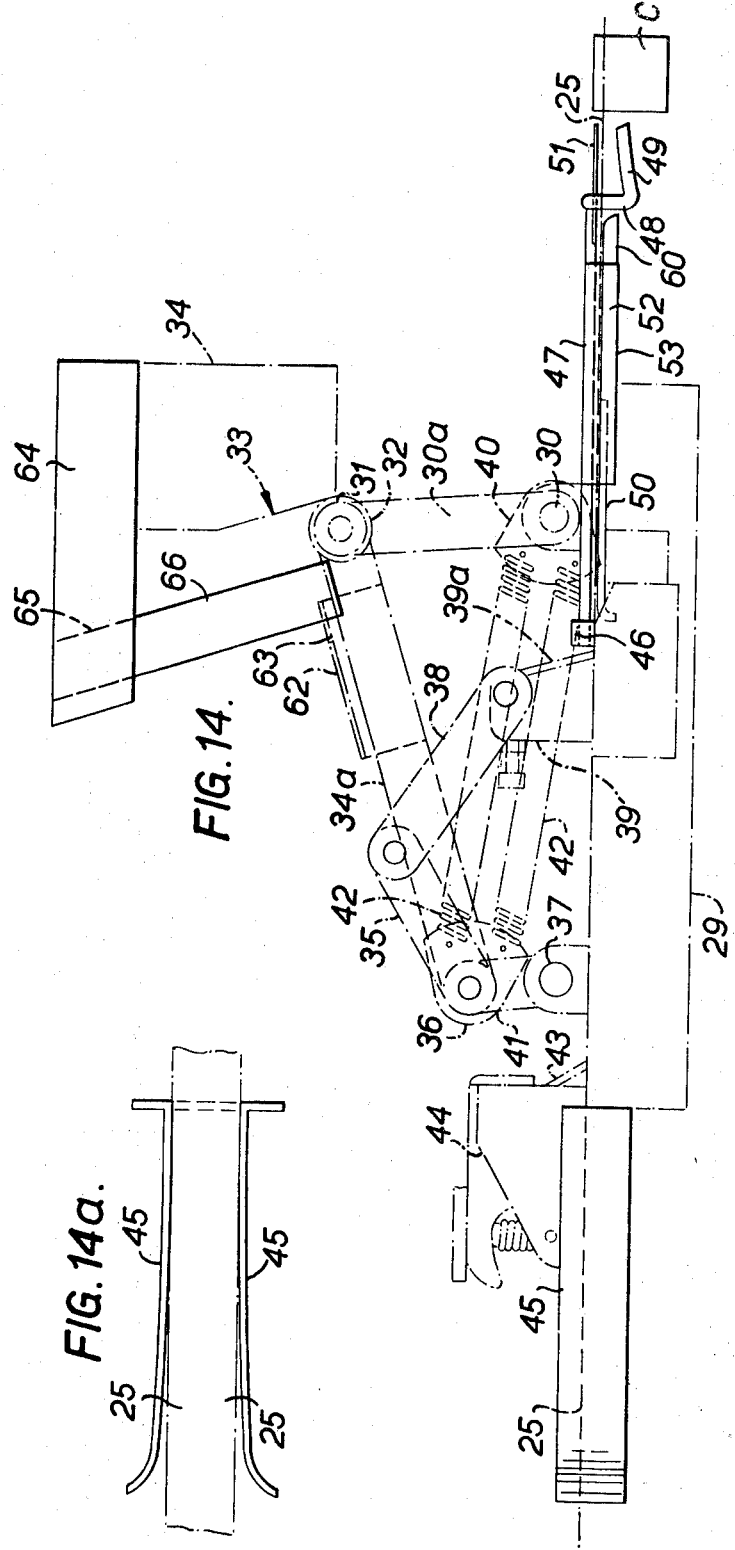

United States Patent Office 3,522,646
Patented Aug. 4, 1970

3,522,646
METHOD OF PRODUCING CLIPS FOR SPRINGS
James Sibthorp, Hill Farm Ave., Watford,
Hertfordshire, England
Original application Nov. 14, 1966, Ser. No. 593,798.
Divided and this application Oct. 25, 1967, Ser.
No. 701,793
Claims priority, application Great Britain, Nov. 12, 1965,
48,174/65; Apr. 8, 1966, 16,951/66; Aug. 17, 1966,
36,839/66
Int. Cl. B23p *17/00*
U.S. Cl. 29—417                8 Claims

ABSTRACT OF THE DISCLOSURE

A metallic clip adapted to be closed round a journal-forming portion of a spring, particularly a sinuous spring such as is used in the making of furniture, the clip being of the type bent to a V-formation with a rounded bend, and with the characteristic that a separate formed channel-shaped liner of plastics material is nested in the bend of the clip after or during the formation of the clip, the liner being preferably mechanically gripped by the metal clip in the forming process. A method of making such a clip by feeding separate strips of metal and plastics material preferably at right angles to one another to a forming station, severing lengths of the metal strip and forming this to the shape of the clip with its rounded bend while simultaneously forming a portion of the plastics strip to provide the liner in the said bend of the clip and preferably while the formed length of plastics remains as an integral part of the plastics strip. The feed of the strip to the forming station takes place while the previously formed clip remains connected to the plastics strip, severing of that clip from the strip preferably taking place in the forming operation. A machine is described for so producing the said clips.

---

Figure 1:
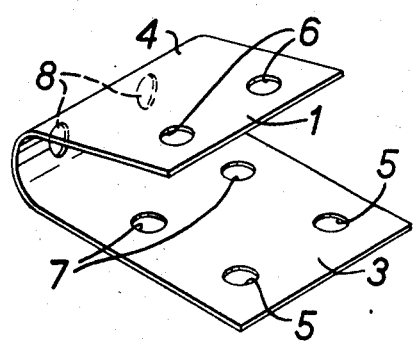

This is a division of application Ser. No. 593,798 filed Nov. 14, 1966, now abandoned.

The present invention relates to improvements in clips for use in anchoring wire springs, especially for mattresses, seats, chairs, settees and other articles of upholstered or other furniture.

These clips are usually made by bending a piece of metal to a substantially V-formation with a rounded bend. A journal portion of the spring may be located in the clip after fixing this and the clip closed sufficiently therearound to hold the said portion as in a bearing. The clip permits the necessary turning movement of the journal portion of the spring in response to flexure of the spring as a whole.

However, with multiple springs so mounted on a frame objectionable noise or squeak will often occur and a medial strip of tape, e.g., canvas tape, may be adhesively secured to the bearing portion of the clip, before shaping the clip.

It has been suggested that the metal clip be provided with a polyethylene coating or a paper fibre cushioning layer adhesively secured to the metal and provided with a protective film or coating of polyethylene. However as far as I am aware the canvas layer or the polyethylene coating or cushioning layer would have been adhered on the strip from which the clips are produced.

The present invention provides a clip within the rounded bend of which is a separate formed channel-shaped liner of plastics material. This will form a nonsqueak bearing for the aforesaid journal portion when the clip is closed therearound. When herein and in the claims hereof I refer to a clip with "a separate formed liner" I mean, in contradistinction to known liners, one in which the liner material has not been combined with the clip until after or during the formation of the clip.

Adhesives can be obviated but it is preferred to form the clip with inwardly projecting biting or gripping edges which bite into or grip the plastics liner to locate this firmly within the clip. To this end one or more holes may be provided, the walls of which are formed to project inwardly of the clip to form the said biting or gripping edges.

One or both side walls of the clip may extend beyond the liner nesting in the apex portion of the clip.

Recesses or notches may be provided at each end of the bend of the clip to expose the ends of the bend of the liner and this latter may extend at each end beyond the corresponding edge of the clip. The liner may advantageously be formed with feathered edges parallel to the bend and spaced from the longitudinal edges of the clip and the method hereinafter described is particularly apt to produce a clip with such a liner and other features hereinbefore mentioned. The liner may be arranged to press most strongly against the clip at or near the two outer edges of the channel and the bend of the channel need be spaced from or only in light contact with the clip. It is preferable to make the liner of a thickness above 0.005" and advantageously greater than 0.030" thick. It is usually desirable not to make the thickness greater than 0.040".

The invention provides a method of cheaply producing clips as aforesaid which comprises feeding separate strips of metal and plastics material to a forming station, severing a length of the metal strip and forming this whilst simultaneously forming a portion of the plastics strip to provide the channel shaped liner in the bend of the clip.

Preferably, the two strips are cross-fed and the liner is formed within the severed metal length whilst maintaining the formed length of plastics as an integral part of the plastics strip and feed of the plastics strip may take place while the last formed clip remains connected to the strip.

The two strips may be fed at right angles to one another to the forming station so that the leading end of the metal strip overlies a portion of the plastics strip immediately behind the previously formed clip and whilst this remains connected to the plastics strip, the severing of the said leading end portion from the metal strip and the simultaneous forming of the clip and the said portion of the plastics strip may take place.

The plastics material being formed may be severed from the plastics liner of the previously formed clip in the said forming operation.

The plastics strip may be displaced towards the forming station whilst laterally guiding the strip between the feed device and the said station and whilst retaining the strip against flexure or buckling by means moving with the feed device.

Notches may be punched in the sides of the metal strip at such a position that when the clip is formed the notches previously described one at each end of the bend of the clip will be formed.

Prior to the metal strip reaching the forming station and between this station and the strip feed mechanism one or more holes may be punched in the strip of such a form that the wall of the or each hole will project inwardly when the desired length of the strip is severed and formed and will provide a sharp or biting edge for biting into or gripping the plastics liner as a result of the forming operation.

The invention furthermore comprises an apparatus for producing clips as aforesaid comprising forming tools, feed mechanism arranged to feed a metal strip in one direction and a plastics strip in a direction at right angles thereto to the forming station, said tools being operative for severing lengths of the metal strip for formation, said forming tools being adapted during the forming of the clip simultaneously to form the plastics strip into a channel shape within the metal clip being formed, and the apparatus being operative so that the said forming of the plastics strip takes place while the portion of the said strip being formed remains as an integral part of the strip.

The apparatus may be constructed and operative so that the forming operation will be initiated whilst the plastics strip remains connected to the plastics liner of the previously formed clip. One of the forming tools may carry a knife which is constructed and arranged to sever the plastics material of the clip being formed from the liner of the said last-formed clip during the forming operation.

The feed of the plastics strip will normally displace the last formed clip from the forming station, but the invention includes a feed mechanism for feeding the plastics strip in which the feed foot carrier is provided with means for engaging the clip last formed during a feed motion and positively displacing this clip and consequently the plastics strip in the event that there is any jamming of the strip or otherwise the strip fails to advance as desired.

The feed means for engaging a clip as aforesaid may project forwardly from the said carrier and serve to restrain the strip from flexing or buckling during its feed travel.

The said means may comprise a bar projecting forwardly from the said carrier and guided by guide means and acting to oppose flexure or buckling of the strip.

A further member may project forwardly and be arranged to lie along the other side of the strip and provision made for guiding it during travel with the feed foot carrier, this member opposing flexure or buckling of the strip in the reverse direction. This member may be a rod extending lengthwise of the strip and arranged centrally thereof.

The forward end of the said bar may carry a forked member for positively displacing an already formed clip if the feed of the strip is insufficient for this purpose. The bar at its forward end may also carry a forwardly projecting leaf spring which will make contact with the strip adjacent the clip last formed during the retracting movement of the feed foot.

In order that the invention may be the more readily understood, reference is hereinafter made to the accompanying drawings, in which embodiments of clips according to the invention and a method of and apparatus for producing them are illustrated by way of example in the accompanying drawings.

Figure 2:
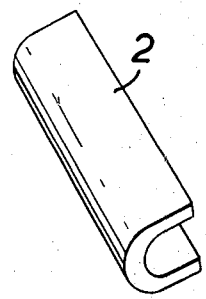
Figure 3:
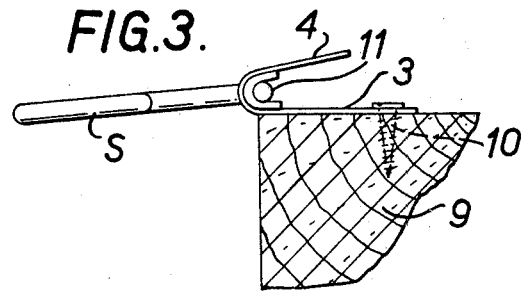
Figure 4:
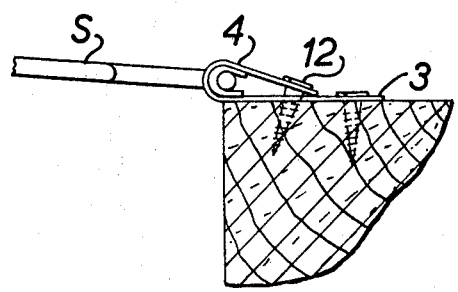
Figure 5:
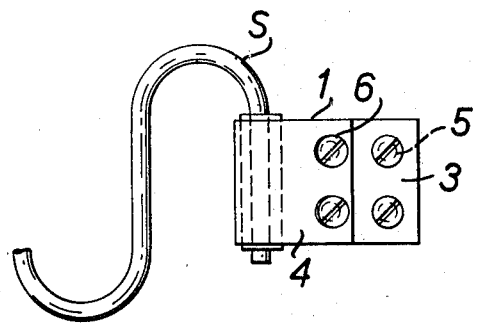
Figure 6:
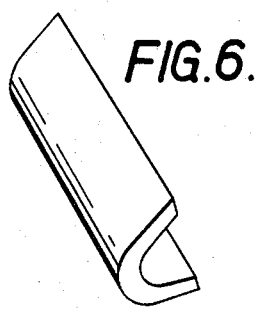
Figure 7:
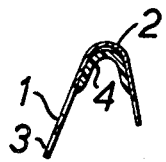
Figure 8:
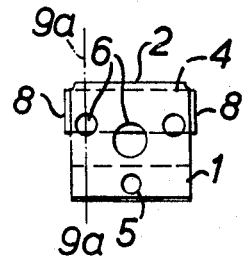
Figure 9:
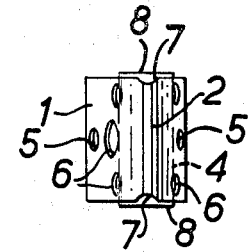
Figure 10:
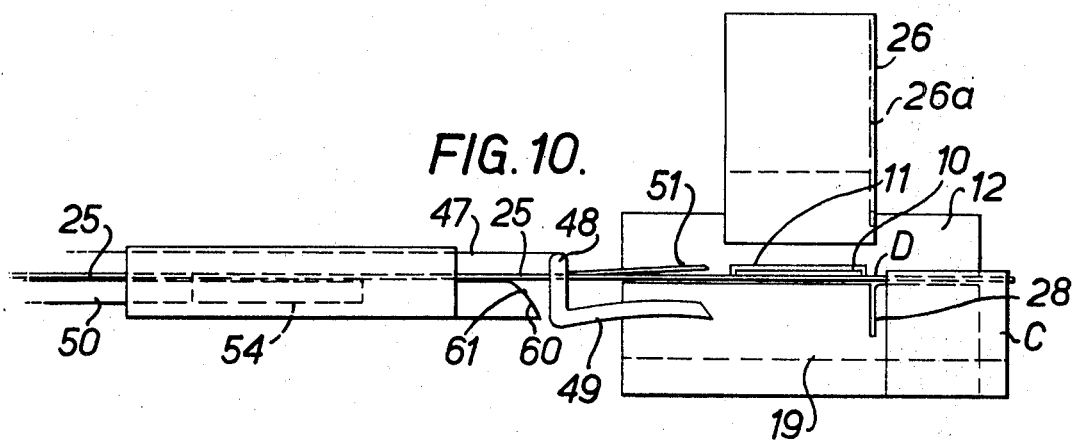
Figure 12:
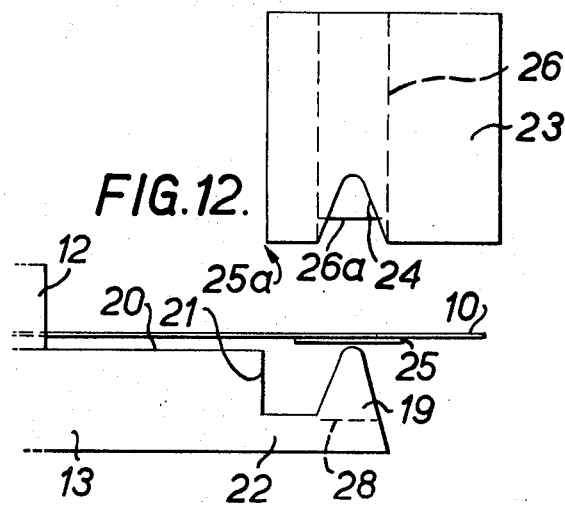
Figure 13:
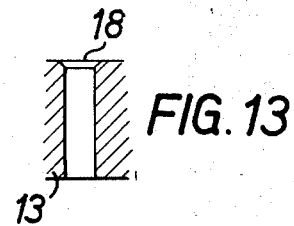

FIG. 1 shows a clip per se;
FIG. 2 is a view of the separated liner;
FIG. 3 shows the clip as fixed as usual to the frame for supporting the spring;
FIG. 4 shows the clip closed to operative position;
FIG. 5 is a plan view of the clip and spring;
FIG. 6 shows a modified cross-sectional form of the plastics liner;
FIG. 7 is a cross-sectional elevation of a further form of clip according to the invention, FIG. 8 is a side elevation thereof and FIG. 9 is a plan view;
FIGS. 10 to 17 illustrate apparatus according to the invention for producing clips as shown in FIGS. 1 to 3.
FIG. 10 is a diagrammatic side elevation of the forming station and FIG. 11 is a plan view thereof but with the top component of a punching die removed. FIG. 12 is a view showing the die-set for forming the strips; FIG. 13 is a detail view; FIG. 14 is a general side elevation showing in dotted outlines a conventional automatic strip feed and indicating the present additions thereto in full line; FIG. 14a is a fragmentary plan of FIG. 14; FIG. 15 is an enlarged plan view of certain of those attachments and FIG. 16 is a cross-sectional elevation on the line 9—9, FIG. 9. FIG. 17 is an end view of one form of plastics strip.

Referring first to FIGS. 1 to 6 the spring is of sinuous form. The clip 1, e.g., of steel sheet or strip is shown in FIG. 1 in its initial form, i.e., opened to a V-form with a rounded apex. The liner 2 is of a suitable plastics material but is preferably of a high grade polyethylene as hereinafter mentioned. The liner may be made as a preformed channel member or formed from the flat in the clip. It is preferably formed during the forming of the clip as will be later herein described. The clip is provided with a long side 3 and a shorter side 4, as a hole or holes 5, being provided in the longer side and holes 6 in the shorter side to align with further holes 7 in the longer side. The clip may be provided with prongs or tongues or holes 8 with pressed in sharp edges to grip or spike the liner to hold the liner securely in the clip. With the liner secured in the clip the longer side of the clip is fixed to the frame 9 by rivets, screws or the like 10 passing through holes 5. The journal 11 of the spring is now inserted into the sleeve into the position shown in FIG. 3. The shorter side of the clip is pressed towards the longer side (FIG. 4) and secured by further rivets, screws or the like 12 passing through holes 6 and 7 and into the frame. The journal of the spring is now located against lateral movement with the liner sufficiently enclosing the journal to enable the latter to rotate without contacting the bearing formed by the metal of the clip.

The cross section of the liner may be modified as shown in FIG. 6 to taper away to thin or feather edges. The clip, see FIGS. 7 to 9, comprises a main metal component 1 bent to a V-formation, with a rounded apex 2 and with one side limb 3 longer than the other. A separate channel-section liner 4 is present in the clip. This is formed of a plastics material, and particularly to enable the clip to be readily produced as is hereinafter described, of a polyethylene known as a high density polyethylene supplied by High Grade Plastics Limited, of Berkampstead, England, of an average thickness in the initial strip from which the liner is formed of approximately 0.032″. The width of the strip may be a little more than ⅞″. The metal strip from which the metal component is produced is a steel strip of ⅞″ width and of a thickness of approximately 0.032″.

The plastics liner piece produced from the strip is shaped substantially to follow the bend of the metal component, although when produced by the hereinafter described method the end portions (those remote from the bend) of the plastics liner will generally be held tightly in the clip and elastically engage the clip and the liner at the bend need not be in contact or only in light contact with the bend of the metal.

It will be observed that in addition to the usual holes 5 which serve for fixation of the clip when bent down to form a bearing for the journal portion of the spring to be affixed, a series of holes 6 are formed in the metal component of the clip. These will have been produced in the strip before severing the individual sections of the latter and in such a manner as is hereinafter described that in each case the wall of the hole is turned in to provide a sharp or biting edge which provides a biting grip by the metal component of the shaped liner piece. The liner can be readily pried out of the clip, when it will elastically expand to a somewhat wider channel and it will clearly bear the indenting imprints of the outline of the holes. It will also be observed that the liner is of a length exceeding that of the metal component so that it protrudes at each end at 8 as indicated in FIGS. 8 and 9 and moreover, part-circular recesses 7 are cut in the metal component to come at the bend so that at the bend an adequate length of plastic extends beyond the edge of the metal at each end.

The method by which it is preferred to produce the clips with the fitted liners, will now be described with reference to FIGS. 10 to 16 of the drawings.

Referring to FIGS. 10 to 13 the general principles of the apparatus and its method of use is depicted. The plan view, FIG. 11, indicates by the arrow A the direction in which the metal strip 10 is fed to the forming zone of the machine. The strip may be drawn upwards from the inside of a coil in usual manner and directed by suitable raised guide means into the desired direction, as is usual in making the simple metal clips without a liner. The feed mechanism provided is commonly known as an automatic press feed and may be that manufactured and sold by George F. Clark and Sons (Toolmakers) Limited, of West Drayton, England. However, the general character of the feed mechanism will be apparent from the following description.

The strip passes through a narrow guideway 11 formed by a recess in the underface of the top component 12 of a punching die the bolster 13 of which is shown in plan in FIG. 5 where the top component has been removed. The feed mechanism and the die bolster are fixed on the frame of a press which carries punches that with the aid of die 12, 13 punch the metal strip to form the holes previously referred to in the clip to be subsequently formed. The holes 14 in the bolster and the punch tool operated by the movement of the press form the two part circular end recesses 7 in the metal clip. The holes 16 will enable the holes to be formed, the walls of which are later to bite into the plastic material. The sharp edges of these holes may be produced by shaping the tops of the holes in the bolster component with an end relief 18 as is indicated in FIG. 13.

The bolster component 13 projects forwardly to form a platform 20 on which the strip is fed forwards and the forward end of this component is shouldered down 21 to form an end portion 22 of reduced height from which upstands the male component 19 of a die-set for shearing off and shaping the leading section of the metal strip that is to be formed. The other component 23 of the die-set is formed with an approximate counterpart recess 24 to the male component of the die and the edge 25a of this component 23 will cooperate during the descent of the component 23, in the operation of the press, with the shouldered portion 21 aforesaid to sever the desired length of metal to form one component of the clip.

In FIGS. 10 and 11 it is to be assumed that the strip 10 will be emerging from the narrow guideway aforesaid (after the holes have been punched) over the platform 20 and over and at right angles to the length of the male component 19 of the die-set.

The plastics liners are also formed from strip material. A coil of the strip material 25 will be located at the left in relation to FIG. 4 and will be fed by the feed mechanism hereinafter described in a direction at right angles to the length of the metal strip.

The plastics strip will be fed so as to come over and parallel to the length of the male component 19 of the die-set but crosswise to and under the metal strip, as can be seen from FIGS. 10 to 12.

The feed movements of the strips will be coordinated with the up and down movements of the press so that when the female die components 23 is to descend and sever and shape the metal component of the clip the punches will descend and prepare the strip with the holes 6 and recesses 7 in a clip to be formed later.

In the operation of forming a clip the metal component will be severed from the strip, and the component fully defined. This is not so insofar as concerns the plastics strip. When the female die component is to descend for a forming operation, the plastics strip will remain in connection with the clip previously formed as well as with the main supply length of strip from the coil. This is indicated in FIGS. 4 and 5, where the said previously formed clip, indicated at C, remains connected with the length of plastics material indicated at D which is to be shaped by the die-set. The female component 23 of the die-set is provided in what will be its rear face in the direction of travel of the plastics strip with a recess 26 containing a knife 26a which partially covers the rear end of the female cavity of the die component and the bottom edge of which is the cutting edge. The male element of the die-set is provided with a narrow vertical transverse slot 28 into which the bottom of the knife can descend. Consequently, whilst the said portion D of the plastics strip remains connected with the main body of the strip and with the liner of the preceding clip C, the female component 23 will sever off the length of metal required for the clip to be formed, the cutting edge will contact the plastics strip adjacent the bend of the last preceding clip C and as the female tool descends and forms the plastics liner and the metal clip to shape, the plastics strip will be completely severed from the liner of the preceding clip C, but when the clip with its liner has been formed to shape, the liner will remain connected to the main length of plastics strip still to be formed.

In usual manner, with the descent of the female die component 23, and the punches, the feed foot for the two strips will be retracted, and the springs of the feed mechanisms (hereinafter described) will be energized ready to perform the next feed of the two strips. As far as concerns the metal strip this feed and retraction may be in conventional manner. During retraction of the feed foot from the strips, the metal strip is restrained in its narrow guideway 11 and the plastics strip remains connected to the previously formed clip, and the feed foot can retract without withdrawing the strips. The next feed of the metal strip is in conventional manner. However, during the next feed movement of the plastics strip, the latter will be connected to the liner of the now last-formed clip which in turn will have been gripped to that clip by the biting edges aforesaid of the holes in the metal component and effectively located and retained. The feed movement of the plastics strip will therefore carry the said last-formed clip from the die-set and locate the next adjacent portion of the plastics strip in position for the next forming operation, this taking place whilst the female die component and the punches rise.

The connection between the last-formed insert and the unformed part of the strip is by way of a progressively changing cross-sectional contour junction section D and moreover as the plastics strip is of relatively soft, flexible material there is a tendency for jamming to occur unless provision is made for avoiding this. Any jamming of the last formed clip in the die-set position is extremely undesirable since the tendency would be for a second metal component to be formed on the last one formed and this may lead to damaging the mechanism and particularly to the rupture of the female component of the die.

Therefore the feed mechanism needs to be modified in relation to that used for feeding the metal strip.

In connection with FIGS. 14 to 16, I will first describe the conventional construction of the feed mechanism as it is common to both that for feeding the metal strip and that for feeding the plastics strip.

The mechanism comprises a frame 29 which is suitably fixed in well known manner to the frame of the press. Pivoted to this frame at opposite sides thereof and on a common pivot axis 30 are two arms 30a between the free ends of which is carried a shaft 31 mounting rollers 32 which act as cam followers which cooperate with the cam face 33 of a cam 34 carried by the press tool. The said shaft is connected by links 34a to two bell-crank levers 35, one at each side of the frame, connected at the elbows by a shaft 36 and each fulcrumed at a common axis 37 to the frame. The free ends of the bell-crank levers are connected by links 38 to a carriage 39 comprising a relatively movable feed foot 39a the carriage being mounted for sliding movement in the base of the frame. Extending between a connector 40 at the pivot of the arms 30a and a connector 41 at the shaft 36 are two powerful tension springs 42, two such springs being located at opposite sides of the machine. During the descent of the press-tool the cam 34 will displace the links 30a through the medium of the cam followers 32, turning the bell-crank levers 35 and releasing the grip of the feed foot 39a on the strip material 25. When the cam on the return stroke permits, the springs 42 will cause operative feed movement of the strip by the said feed foot to an extent which may be regulated by the conventional stop the location of which can be determined by conventional micrometer control of a screw under the raised base of the frame. A rear blade 43 on a suitable carrier 44 permits forward movement of the strip material but prevents rearward movement. The brief description of the aforesaid applies to both the metal strip feed mechanism and that for feeding the plastics strip and since this mechanism is the conventional Clark automatic press feed aforesaid, a description in greater detail is unnecessary to any one skilled in the art.

However, for the purpose of the present invention, it is desirable to depart from the conventional feed mechanism in relation to the construction of the mechanism for feeding the plastics strip, bearing in mind its function as hereinbefore described in relation to FIGS. 10 to 13. Firstly, it has been found desirable effectively to guide the plastics strip into the feeding mechanism and the feeder illustrated in FIGS. 14 to 16 is provided (FIGS. 14 to 14a) with two rearwardly extending spring guides 45 between which the strip 25 passes while effectively laterally located to the inlet end of the feed mechanism. Moreover on the usual sliding carrier 39 for the controllable feed foot 39a is attached by means of screws, a bridge member 46 (FIGS. 14 and 15) which bridges the plastics strip 25. Secured under the bridging part of this member is a stiff or rigid flat bar 47 (FIGS. 10, 14, 15) to the forward end of which is welded or otherwise secured an inverted shallow U-shaped wire member 48 the free ends 49 of which are bent back to lie in the general direction of the bar 47 and to project beyond the forward end thereof. These free ends are shaped so that their free extremities can engage a shaped clip still connected to the plastics strip at the forming station when necessary to ensure positive displacement of the clip and the connected plastics strip. Also secured to the slidable carrier 39 of the feed foot 39a is a stiff circular-section rod 50 which also projects forwardly and underlies the central zone of the said bar and extends parallel thereto. A thin flat member, e.g., leaf spring 51 is welded or otherwise fixed to the underface of the bar at the leading end of the bar and projects forwardly of the forward end of the bar substantially to the same extent as the free ends 49 of the member 48. Attached to the forward part of the frame of the mechanism is a guide 52 for the said bar and for the strip. This guide comprises a base plate 53 (FIG. 16) which is longitudinally and centrally grooved at 54 slidably to receive the forward end of the said rod 50. To the base plate are fixed by screws two upper side plates 55, 56 which are recessed at 57 and the edges 58 of which provide between them a guideway for the bar 47 of approximately the width of the bar. The strip 25 is fed by the feed foot 39a under the bridge of the member 46 and with and under the bar 47 and with and over the rod 50 onto the base plate 53 so that its margins will be received in the recesses 57 of the plates 55, 56 the side walls of which are spaced from one another approximately to the width of the strip so that the strip is accurately laterally located. The side plates 55, 56 are recessed at 59 and the base plate is correspondingly recessed and has a forward forked extension 60 the leading ends of which are chamfered off at the top as indicated in FIGS. 10 and 15 and are disposed just behind the depending portions of the member 48. The feed of the plastics strip will displace the last formed clip and is transmitted from the feed foot through the length of plastics material between it and the said clip. As a result of the modifications of the feed mechanism described, the plastics strip will be maintained against flexure or buckling up to the forward end of the bar and the feed foot can act through the member 48 fixed to the bar to give a positive push to a clip at the forming station if necessary, e.g., if there is any tendency of the plastics strip to jam. The chamfered ends 61 will facilitate accommodation of the lie of the strip just behind the forming position.

A cam such as indicated by 34 (FIG. 14) will be attached to the press tool so as to rise and descend with the tool and be associated with each feeder. As to the feed mechanism for the plastics strip, however, the usual reinforcing bridging plate 62 behind the cam followers and across the links 34a is centrally notched at 63 in its forward edge. To the cam is rigidly fixed, as by welding, a rigid bar 64 which has an inclined recess 65 fixedly to accommodate one end of an inclined depending arm 66 which can engage in the said notch. This arm extends parallel to the slope of the cam and is so spaced therefrom that it can engage the shaft 31 between the cam follower rollers 32 and ensure a positive return of the shaft to its original position and feed of the plastics strip if the springs fail to achieve this.

Now it can be seen that when the press tool is descending the cams 34 will press on the cam followers and urge the links 34a rearwards, releasing the feed foot and energising the tension springs. The strip retaining blades 43 appertaining to each feed mechanism will meanwhile hold the strips against displacement. As the feed foot of the plastics strip feed mechanism is retracted the bar 47 and rod 50 will move with it but the plastics strip 25 will remain stationary although held flat by the bar and the rod between the feed foot 39a and the forward part of the guide 52. The leaf spring 51 will exert a gentle holding down stroking action of the plastics strip just behind the last formed clip. The portion D aforesaid of the strip will be left projecting forwardly of the blade spring and of the prongs 49 of the member 48 and immediately under the female die component and under the leading portion of the metal strip which has been advanced by its feed stroke. This portion D will extend lengthwise of and over the male component of the die-set, and under the loading portion of the metal strip. In the descent of the press tool the female and male components 23, 19 of the die-set will simultaneously form both the metal strip and the plastics liner; the end portion of the metal strip will be sheared off by shearing edges 21, 25 and the knife 26a will descend and sever the plastics strip from the clip C that has been previously formed. The liner of the new clip formed by this pressing operation will be connected still to the main length of plastics strip material. Now with the rise of the press tool, the tensioned springs take over and as will now be permitted by the sloping part of the cam, the feed foot will be steadily advanced with the bar 47 and rod 50 and the plastics strip will be advanced. The clip that has been severed from the plastics strip in the last pressing operation will now be ejected, the clip last formed but still connected to the plastics strip will be advanced from the forming position (the members 51 holding down the strip and preventing an uptilt of the said clip) and the next adjacent portion of the plastics strip brought to the forming station, and the metal strip advanced to bring its leading portion over the said portion of the plastics strip behind the last formed clip and at the forming station. The forwardly extending free ends 49 of the said U-shaped member 48 will insure that if the feed of the plastics strip is not fully operative to displace the last formed clip from the forming station it will be pushed forward by the said free ends. Now before the next forming operation the feed foot will be released and displaced by the direct action of the cams on the cam-follower rollers. The strips remain in position but the bar 47 with the U-shaped member 48 and the leaf spring 51 will move back with the feed foot, the said spring 51 pressing on the plastics material immediately behind the portion that was last formed and the rod will also move back with the feed foot, guided by the passage 54 in the guide 52. Thus portions of each strip will be exposed for the forming operation.

Although the feed of the plastics strip acts to displace the last formed clip still connected to the plastics strip from the forming station and the bar 47 and rod 50 practically preclude buckling or flexure of that strip between the feed foot and the forming station, the member 48 will act as a safety control to engage the clip and positively displace it with the movement of the feed foot even if the feed of the plastics strip itself fails or partially fails effectively to achieve the displacement.

The knife 26a need not be provided and if this is omitted the plastic strip will emerge in the formed condition and with the formed metal components spaced therealong. The formed plastics strip will emerge in a somewhat curved form, but the individual lined clips can be readily produced by severing the formed plastics strip in the narrow separating zones between adjacent clips.

The cross-sectional form of a strip that has been found suitable is shown in FIG. 17. It may be fed through the feeding mechanism described with the convex face towards the aforesaid rod, but it may be fed in the reverse lie.

What I claim is:

1. The method of producing a clip adapted to be closed round a journal such as a journal portion of a spring, and comprising a rounded bend within which is a separate formed channel-shaped liner of plastics material, which comprises feeding separate strips of metal and plastics material to a forming station, severing a length of the metal strip and forming this to the shape of the clip whilst simultaneously forming a portion of the plastics strip to provide the liner in the said bend of the clip.

2. The method according to claim 1, which comprises cross-feeding the two strips and forming the plastics liner within the severed metal length whilst maintaining the formed length of plastics as an integral part of the plastics strip.

3. The method according to claim 1 in which the feed of the plastics strip takes place while the last formed clip remains connected thereto.

4. The method according to claim 1, which comprises feeding the metal strip and the plastics strip at right angles to one another to the forming station so that the leading end of the metal strip overlies a portion of the plastics strip immediately behind the previously formed clip and whilst this remains connected to the plastics strip and then severing the said leading end portion from the metal strip and simultaneously forming the clip and the said portion of the plastics strip.

5. The method according to claim 3, which further comprises severing the plastics material being formed from the plastics liner of the previously formed clip in the forming operation.

6. The method according to claim 1 which further comprises displacing the plastics strip towards the forming station whilst laterally guiding the strip between a feed device for said strip and the said station and whilst retaining the strip against flexure or buckling by means moving with the feed device.

7. The method according to claim 1 which comprises punching notches in the sides of the metal strip at such a position that when the clip is formed a said notch will be present in the clip at each end of the bend.

8. The method according to claim 1 which comprises prior to the forming station punching one or more holes in the metal strip so that the wall of the hole or each hole will project inwardly when the desired length of the strip is severed and formed and will provide a sharp or biting edge for biting into or gripping the plastics liner as a result of the forming operation.

References Cited

UNITED STATES PATENTS

| | | | |
|---|---|---|---|
| 2,036,787 | 4/1936 | Zabriskie | 29—417 |
| 2,322,290 | 6/1943 | Gabel. | |
| 2,843,192 | 7/1958 | Krakauer. | |
| 2,845,693 | 8/1958 | Shetterly | 29—417 XR |
| 3,010,195 | 11/1961 | Richards | 29—417 XR |

FOREIGN PATENTS 738,305    7/1966    Canada.

CHARLIE T. MOON, Primary Examiner

U.S. Cl. X.R.

24—73; 29—509, 515, 445; 5—259